(12) United States Patent
Zomet et al.

(10) Patent No.: US 9,235,782 B1
(45) Date of Patent: Jan. 12, 2016

(54) SEARCHING IMAGES AND IDENTIFYING IMAGES WITH SIMILAR FACIAL FEATURES

(71) Applicant: Google Inc., Mountain View, CA (US)

(72) Inventors: Asaf Zomet, Jerusalem (IL); Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 366 days.

(21) Appl. No.: 13/726,390

(22) Filed: Dec. 24, 2012

(51) Int. Cl.
*G06K 9/62* (2006.01)

(52) U.S. Cl.
CPC ..................... *G06K 9/6256* (2013.01)

(58) Field of Classification Search
CPC ............... G06K 9/2054; G06K 9/6256; G06T 2207/10016
USPC ................... 382/159, 181, 190, 201
See application file for complete search history.

(56) References Cited

U.S. PATENT DOCUMENTS

| 7,274,822 | B2 | 9/2007 | Zhang et al. | |
| 7,308,133 | B2 | 12/2007 | Gutta et al. | |
| 7,475,071 | B1* | 1/2009 | Liu et al. | |
| 7,961,986 | B1* | 6/2011 | Jing et al. | 382/305 |
| 2009/0034805 | A1* | 2/2009 | Perlmutter et al. | 382/118 |
| 2009/0290812 | A1* | 11/2009 | Naaman et al. | 382/305 |
| 2010/0257129 | A1* | 10/2010 | Lyon et al. | 706/12 |
| 2011/0116690 | A1* | 5/2011 | Ross et al. | 382/118 |
| 2012/0254183 | A1* | 10/2012 | Ailon et al. | 707/738 |
| 2012/0308124 | A1* | 12/2012 | Belhumeur et al. | 382/159 |

FOREIGN PATENT DOCUMENTS

| CN | 1776711 | 5/2006 |
| CN | 1885310 | 12/2006 |
| KR | 2004079637 | 9/2004 |

OTHER PUBLICATIONS

Gal Chechik et al. "Large Scale Online Learning of Image Similarity Through Ranking", Journal of Machine Learning Research, vol. 11, pp. 1109-1135, Mar. 2010.*

* cited by examiner

*Primary Examiner* — Samir Ahmed
(74) *Attorney, Agent, or Firm* — Patent Law Works LLP

(57) ABSTRACT

A system and method for searching images and identifying images with similar facial features is disclosed. In one implementation, the system includes a pre-processing module, a feature extraction module, a model creation module, a similarity identifier module and a results display module. The pre-processing module receives a facial image, determines key-points associated with a facial feature and identifies a facial area including the facial feature. The feature extraction module extracts the key-points. The model creation module creates a similarity model for determining similar facial features at least in part by comparing the facial feature from a plurality of images. The similarity identifier module applies the similarity model to the facial feature an image in relation to the facial feature in other images and determines which other image has a most similar facial feature. The results display module presents a result based at least in part on the determination.

20 Claims, 8 Drawing Sheets

SEARCHING IMAGES AND IDENTIFYING IMAGES WITH SIMILAR FACIAL FEATURES

BACKGROUND

Identifying similar facial features is interesting to individuals and arises in multiple contexts. One example context is with a child's facial features. Individuals identify which facial feature is similar to that of which parent or relative. For example, an individual may conclude "He has his mother's eyes and his father's nose." Another example context is with celebrities' facial features. Individuals are curious about which celebrity their facial feature is most similar to. For example, the individual desires to know which celebrity has the most similar nose, or whether the individual's nose is more similar to that of celebrity A or celebrity B. Yet another context is with doppelgangers. An individual desires to know whether anyone else has a near identical facial feature. For example, the individual has a distinct chin and wants to identify if anyone else has a similar chin.

A problem is that current systems do not identify similar facial features in most cases. Specifically, current systems do not identify at least one facial feature from a plurality of facial images as most similar to the facial feature of a query facial image. More specifically, the current systems do not search facial images retrieved from an image search, an individual's social network or electronic database to identify an image with a facial feature most similar to the query image.

SUMMARY

The specification overcomes the deficiencies and limitations of the prior art at least in part by providing a system and method for searching images and identifying images with similar facial features.

In some examples, the specification describes a system, method and computer program product for searching images and identifying images with similar facial features. In one example, the system comprises a pre-processing module, a model creation module, a similarity identifier module and a results display module. The pre-processing module receives a facial image, wherein the facial image may be one or more of a query image, training image and an other image and to identify at least one facial area, wherein each facial area includes at least one facial feature. The model creation module creates a similarity model for determining similar facial features, wherein the model is created at least in part by comparing the facial feature from a plurality of training images using online machine learning. The similarity identifier module applies the similarity model to the facial feature from the query image in relation to the facial feature from a plurality of other images and determines at least one image of the plurality of other images as having a most similar facial feature to the facial feature of the query image. The results display module presents at least one result based at least in part on the determination. In one example, the system further includes a ranking module to rank a plurality of results and the results display module presents the plurality of results in ranked order. In one example, the system also includes a ranking module to rank a plurality of results; and the results display module presents the plurality of results in ranked order.

The disclosure also includes a method for searching images and identifying images with similar facial features. The method includes receiving a facial image, wherein the facial image may be one or more of a query image, training image and an other image; identifying at least one facial area, wherein each facial area includes at least one facial feature; creating a similarity model for determining similar facial features, wherein the model is created at least in part by comparing the facial feature from a plurality of training images using online machine learning; applying the similarity model to the facial feature from the query image in relation to the facial feature from a plurality of other images; determining at least one image of the plurality of other images as having a most similar facial feature to the facial feature of the query image; and presenting at least one result based at least in part on the determination.

The disclosure also includes a computer program product for searching images and identifying images with similar facial features. The computer program product comprises a non-transitory computer readable medium encoding instructions that, in response to execution by a computing device, cause the computing device to perform operations comprising receiving a facial image, wherein the facial image may be one or more of a query image, training image and an other image; identifying at least one facial area, wherein each facial area includes at least one facial feature; creating a similarity model for determining similar facial features, wherein the model is created at least in part by comparing the facial feature from a plurality of training images; applying the similarity model to the facial feature from the query image in relation to the facial feature from a plurality of other images; determining at least one image of the plurality of other images as having a most similar facial feature to the facial feature of the query image; and presenting at least one result based at least in part on the determination.

One or more of the implementations described can also include the following components: 1) the facial image is received from one or more sources including a user, a social network and an image search engine; 2) the at least one facial feature is at least one of an eye, an ear, a nose, a mouth, a chin, a jaw line, a cheekbone, lips, a complexion, a skin tone, a hair color, an eyebrow, a forehead and a hairline; 3) the model is created at least in part by comparing a plurality of triplets comprising three images of the facial feature from three training images; 4) the model is created at least in part by a learning algorithm with large margin criterion; 5) applying the similarity model to the facial feature from the query image in relation to the facial feature from a plurality of other images comprises applying the similarity model to a feature set from the query image in relation to a feature set from each of the plurality of other images, the feature set based at least in part on at least one key-point associated with the facial feature; 6) applying the similarity model to the facial feature from the query image in relation to the facial feature from a plurality of other images assigns a similarity measure and the determination is based at least in part on the similarity measure; 7) the at least one result includes one or more of the at least one image having a most similar feature, a feature set of the most similar feature, a scaled area associated with the most similar feature and the similarity measure associated with the most similar feature; 8) a plurality of results is presented, and the plurality of results are ranked and presented in ranked order.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
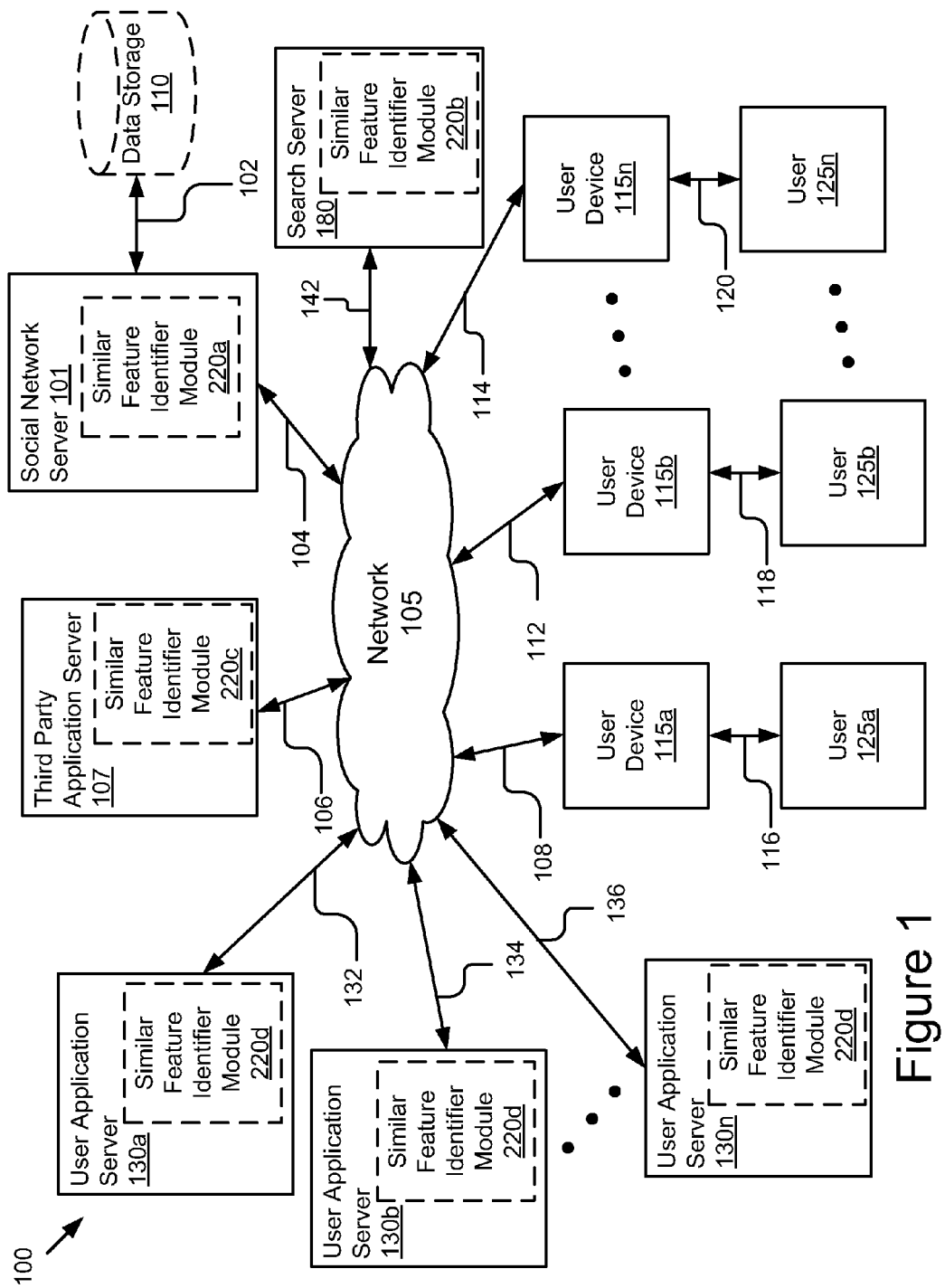
FIG. 1 illustrates a system for searching images and identifying images with similar facial features according to one implementation.

A system and method for searching images and identifying images with similar facial features is described. In one implementation, a user provides the system with a query image including one or more query facial features. In one implementation, the system applies a model to other images. In one implementation, the model is generated using machine learning, for example, machine learning using large margin criterion. Depending on the implementation, the other images include, but are not limited to, one or more of additional images provided by the user, training images, images on the Internet, etc. The application of the model identifies one or more images that contain a feature(s) most similar to the one or more query features.

In the following description, for purposes of explanation, numerous specific details are set forth in order to provide a thorough understanding of the implementations. It will be apparent, however, to one skilled in the art that the implementations can be practiced without these specific details. In other instances, structures and devices are shown in block diagram form in order to avoid obscuring the implementations. For example, one implementation is described below with reference to user interfaces and particular hardware. However, the present implementations apply to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 illustrates a block diagram of a system 100 for searching images and identifying images with similar facial features according to one implementation. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), user application servers 130a, 130b, and 130n (also referred to collectively as user application servers 130 or individually as user application server 130), a social network server 101, a search server 180 and a third party server 107. In the illustrated implementation, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the social network server 101 and the third party server 107, in practice any number of networks 105 can be connected to the entities. Furthermore, while only one third party server 107 is shown, the system 100 can include any number of third party servers 107.

Although only one social network server 101 is shown, it will be recognized that multiple servers may be present. A social network is any type of social structure where the users are connected by a common feature. Examples include, but are not limited to, blogs, microblogs and Internet forums. The common feature includes friendship, family, a common interest, etc.

In one implementation, a similar feature identifier module 220a is included in the social network server 101 and is operable on the social network server 101, which is connected to the network 105 via signal line 104. In another implementation, the similar feature identifier module 220b is included in the search server 180 and is operable on the search server 180, which is connected to the network 105 via signal line 142. In another implementation, the similar feature identifier module 220c is included in the third party application server 107 and is operable on the third party application server 107, which is connected to the network 105 via signal line 106. In yet another implementation, the similar feature identifier module 220d is included in one or more of the user application servers 130a, 130b, 130n and is operable on the one or more user application servers 130a, 130b, 130n, which are connected to the network 105 via signal lines 132, 134, 136, respectively. It will be recognized that the similar feature identifier module 220a/220b/220c/220d (referred to generally as the similar feature identifier module 220) can be stored in any combination on the servers. In some implementations the similar feature identifier module 220 includes multiple, distributed modules that cooperate with each other to perform the functions described below. Details describing the functionality and components of the similar feature identifier module 220 are explained in further detail below with regard to FIG. 3.

The network 105 enables communications between user devices 115, the social network server 101, the search server 180, the user application servers 130 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one implementation, the network 105 is an IP-based wide or metropolitan area network.

In some implementations, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated implementation, the user devices 115a, 115b and 115n are coupled to the network 105 via signal lines 108, 112 and 114, respectively. The user 125a is communicatively coupled to the user device 115a via signal line 116. Similarly, the user 125b is coupled to the user device 115b via signal line 118, and the user 125n is coupled to the user device 115b via signal line 120. The third party application server 107 is communicatively coupled to the network 105 via signal line 106. The user application servers 130a, 130b and 130n are communicatively coupled to the network 105 via signal lines 132, 134 and 136, respectively. The social network server 101 is communicatively coupled to the network 105 via signal line 104. In one implementation, the social network server 101 is communicatively coupled to data storage 110 via signal line 102.

In one implementation, data storage 110 stores data and information of each user 125 of the social network 101. In one implementation, the stored data and information includes one or more facial images. For example, a profile picture of the user's face, pictures of the user's friends and family, pictures of other users, etc. In one implementation, the data and information includes identifying information associated with each user 125. Examples of identifying information include, but are not limited to, the user's name, screen name, contact information (e.g., address, e-mail address, phone number, etc.), sex, relationship status, likes, interests, links, education and employment history, location, political views, religion, industry sector, products and services provided, etc. In one implementation, the information stored in data storage 110 also includes the user's list of current and past contacts and the user's activities within the social network 101, including, for example, anything the user posts within the social network 101 and any messages that the user sends to other users. In another implementation, which is discussed below, a storage device 214 (see FIG. 2) is included in the social network server 101 (i.e., a computing device 200) and the storage device 214 stores the data and information of users 125 of the social network 101 (e.g., one or more facial images).

In one implementation, the user device 115 is an electronic device having a web browser for interacting with the various servers 101, 107, 180, 130*a*, 130*b*, . . . 130*n* and user devices 115 of the system 100 via the network 105 and is used by a user 125 to access information in the system 100. The user device 115 can be, for example, a laptop computer, a desktop computer, a tablet computer, a mobile telephone, a personal digital assistant (PDA), a mobile email device, a portable game player, a portable music player, a portable music player, or any other electronic device capable of accessing a network. The user 125 is a human user of the user device 115.

Figure 2:
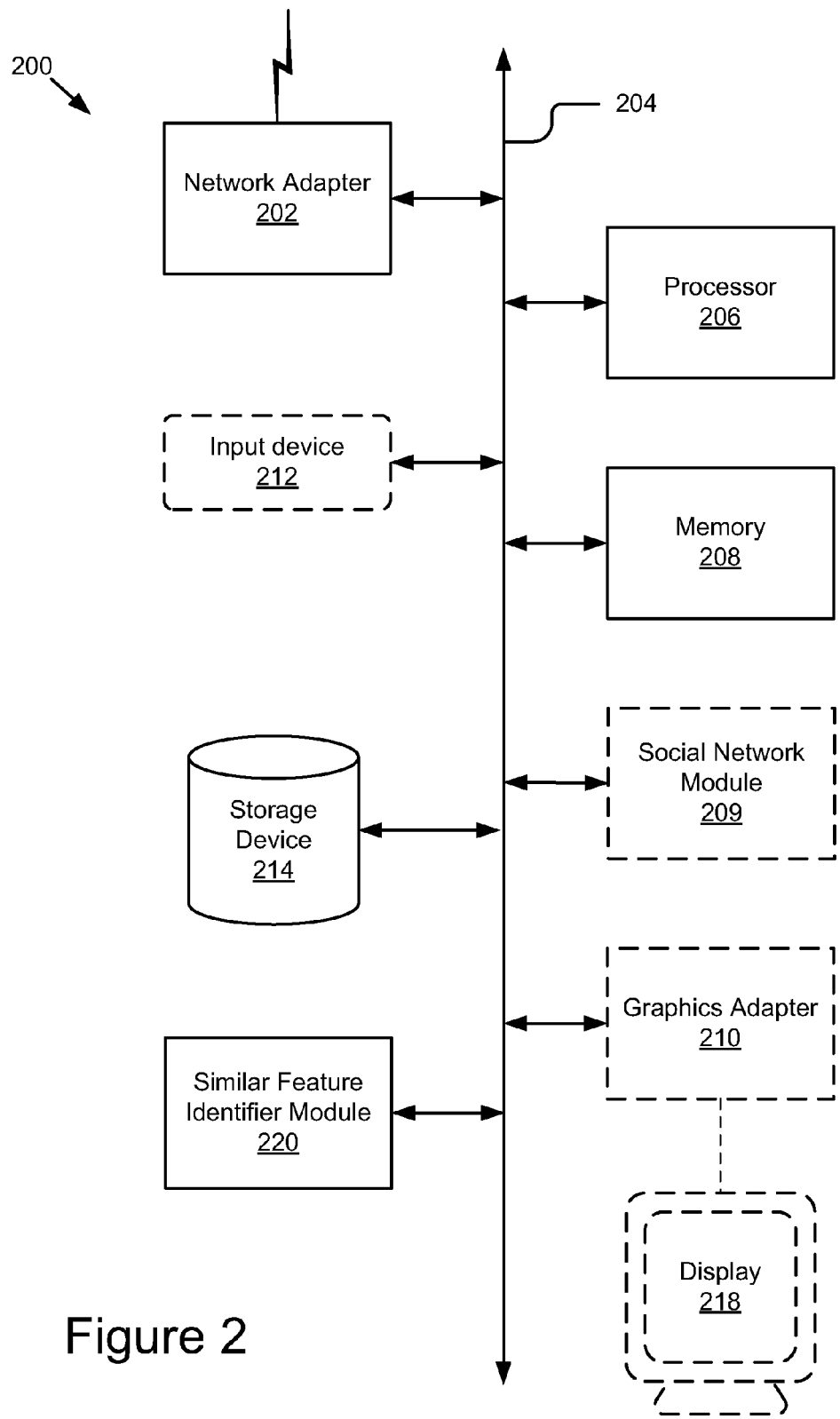
FIG. 2 is a block diagram illustrating a computing device according to one implementation.

FIG. 2 is a block diagram of an implementation of a computing device 200 according to one implementation. As illustrated in FIG. 2, the computing device 200 includes a network adapter 202 coupled to a bus 204. According to one implementation, also coupled to the bus 204 are at least one processor 206, memory 208, an optional social network module 209, a graphics adapter 210, an input device 212, a storage device 214 and a similar feature identifier module 220. In one implementation, the functionality of the bus 204 is provided by an interconnecting chipset. The computing device 200 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory is a non-transitory storage medium. The memory 208 holds instructions and/or data that may be executed by the processor 206. In one implementation, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one implementation, the similar feature identifier module 220 is stored in memory 208 and executable by the processor 206.

The computing device 200, in one implementation, is a social network server 101 and contains the social network module 209. The social network module 209 is software and routines executable by the processor 206 to control the interaction between the social network server 101, storage device 214 and the user devices 115. An implementation of the social network module 209 allows users 125 of user devices 115 to perform social functions between other users 125 of user devices 115 within the system 100. In another implementation, the computing device 200 is a user application server 130*a*/130*b*/130*n*. In another implementation, the computing device 200 is a search server 180. In yet another implementation, the computing device 200 is a third party server 107.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one implementation, the stored data and information includes one or more facial images. For example, the storage device 214 of the social network server 101 stores one or more of a profile picture of users' 125 faces, pictures of the users' 125 friends and family, pictures of other users 125, etc.

The input device 212 may include a mouse, track ball, or other type of pointing device to input data into the computing device 115. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The similar feature identifier module 220 is code and routines executable by the processor 206 to search images and identify images with similar facial features. In one implementation, the similar feature identifier module 220 is a set of instructions executable by the processor 206. In another implementation, the similar feature identifier module 220 is stored in the memory 208 and is accessible and executable by the processor 206. Details describing the functionality and components of the similar feature identifier module 220 are explained in further detail below in reference to FIG. 3.

As is known in the art, a computing device 200 can have different and/or other components than those shown in FIG. 2. In addition, the computing device 200 can lack certain illustrated components. For example, in one implementation, the computing device 200 is a social network server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one implementation, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
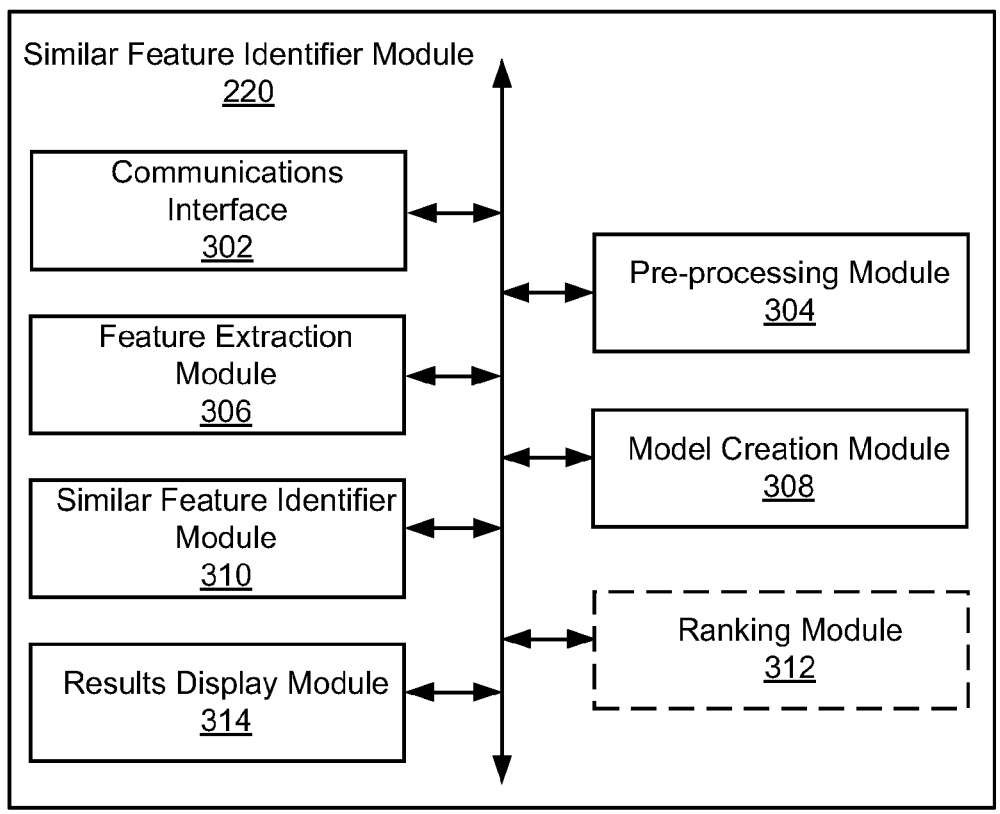
FIG. 3 is a block diagram illustrating a similar feature identifier module according to one implementation.

Referring now to FIG. 3, the similar feature identifier module 220 is shown in more detail according to one implementation. FIG. 3 is a block diagram of an example of the similar feature identifier module 220 included in a computing device 200 (e.g., a social network server 101).

In one implementation, the similar feature identifier module 220 comprises a communications interface 302, a pre-processing module 304, a feature extraction module 306, a model creation module 308, a similarity identifier module 310 and a results display module 314. In one implementation, the similar feature identifier module 220 optionally includes a ranking module 312.

It will be recognized that the modules 302, 304, 306, 308, 310, 312, 314 comprised in the similar feature identifier module 220 are not necessarily all on the same computing device 200. In one implementation, the modules 302, 304, 306, 308, 310, 312, 314 are distributed across multiple computing devices 200. For example, in one implementation, the pre-processing module 304 is included in the search server 180 and the other modules 302, 306, 308, 310, 312, 314 are included in the social network server 101.

The communication interface 302 is code and routines for handling communications between the pre-processing module 304, the feature extraction module 306, the model creation module 308, the similarity identifier module 310, the ranking module 312 (depending on the implementation), the results display module 314 and other components of the computing device 200. In one implementation, the communication interface 302 is a set of instructions executable by the processor 206. In another implementation, the communication interface 302 is stored in the memory 208 and is accessible and executable by the processor 206. In either implementation, the communication interface 302 is adapted for cooperation and communication with the processor 206 and other components of the computing device 200 including components of the similar feature identifier module 220.

The communication interface 302 handles communications between the pre-processing module 304, the feature extraction module 306, the model creation module 308, the similarity identifier module 310, the ranking module 312 (depending on the implementation), the results display module 314 and other components of the computing device 200. For example, the communication interface 202 communicates with the pre-processing module 304 and the feature extraction module 306 to pass the output of the pre-processing module 304 (one or more scaled areas) to the feature extraction module 306. However, this description may occasionally omit mention of the communication interface 302 for purposes of clarity and convenience. For example, for purposes of clarity and convenience, the above scenario may be described as the pre-processing module 304 passing one or more scaled areas to the feature extraction module 306.

The pre-processing module 304 is code and routines for processing facial images. In one implementation, the pre-processing module 304 is a set of instructions executable by the processor 206. In another implementation, the pre-processing module 304 is stored in the memory 208 and is accessible and executable by the processor 206. In either implementation, the pre-processing module 304 is adapted for cooperation and communication with the processor 206 and other components of the computing device 200 including other components of the similar feature identifier module 220.

The pre-processing module 304 processes facial images to enable accurate identification of similar facial features. A facial feature is an attribute or part of the face. Examples of facial features include but are not limited to the hairline, forehead, eyebrows, eyes, ears, nose, mouth, teeth, chin, cheekbones, ears, jawline, lips, complexion, skin tone, hair color, eyebrow, etc. In one implementation, pre-processing module 304 processes facial images in order to provide a level of uniformity and standardization between each facial image, thereby improving the subsequent comparison of facial features and the accuracy of identified similar facial features. For example, in one implementation, the pre-processing module 304 processes a facial image to conform to a canonical face then defines one or more facial areas and scales the one or more facial areas to a standardized area.

Figure 4:
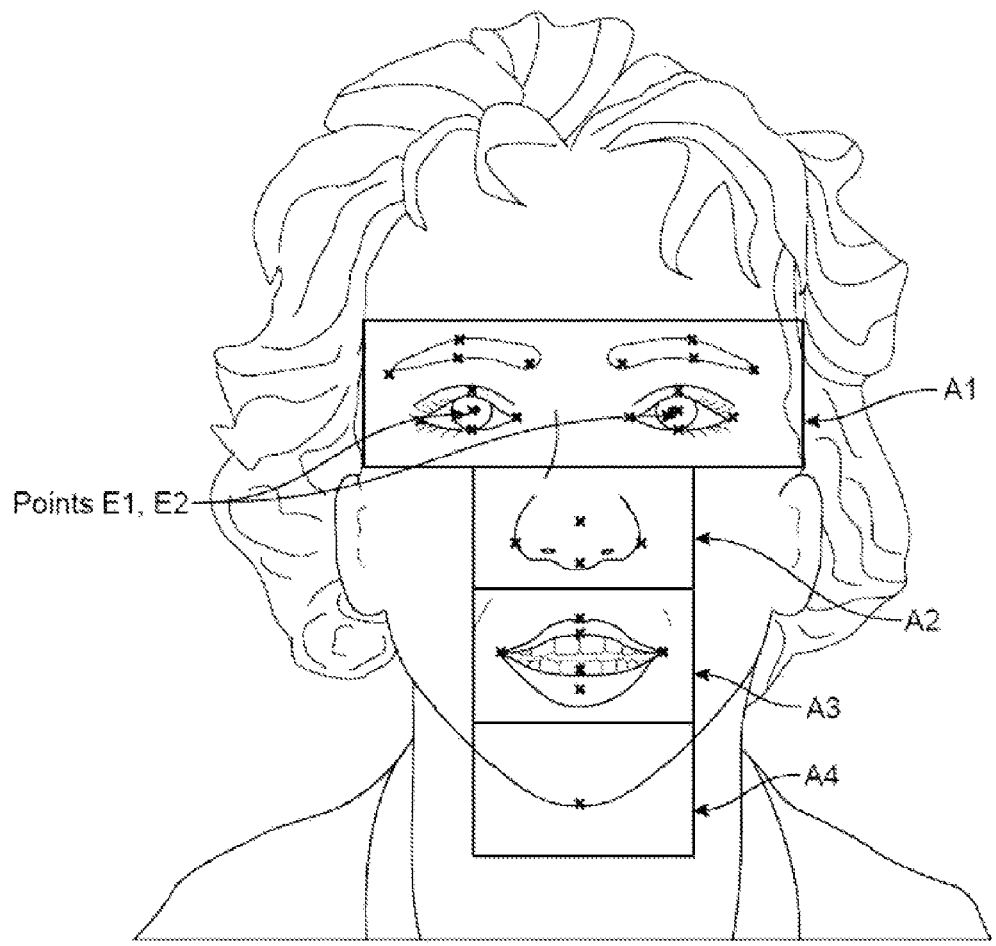
FIG. 4 is a depiction of a facial image according to one implementation.

In one implementation, a canonical face is a frontal view of a face. For example, the image includes two eyes, the centers of both eyes are at specific locations on the same horizontal plane and the tip of the nose is approximately centered horizontally between the eyes. FIG. 4 depicts a facial image, which is an example of a canonical face according to one implementation. In FIG. 4, the canonical face is a frontal view of a face. The face contains two eyes. The centers of the eyes are on the same horizontal plane and at specific locations E1 and E2. The tip of the nose is approximately half way between E1 and E2 horizontally.

In another implementation, the canonical face is an image containing a profile, or side, view of a face. For example, the one or more rules include that the image contains only one eye, one ear and a chin. In yet another implementation, the canonical face is an image containing an oblique view of a face. The foregoing are just examples of canonical faces. It will be understood that other examples exist and may be applied without departing from the teachings herein.

In one implementation, the canonical face is based at least in part on the training facial images used to create the similarity model, which is discussed below. For example, if training images comprised frontal views of the face, the canonical face is a frontal view of the face. In another implementation, the canonical face is independent of the orientation of the faces in the training facial images.

In one implementation, the pre-processing module 304 processes a facial image by receiving a facial image, detecting the facial image's key-points and applying a warping transformation. The pre-processing module 304 is configured to receive one or more facial images. The one or more facial images received by the pre-processing module 304 are sometimes referred to herein as different types of facial images based at least in part on how the one or more facial images are used by the similar feature identifier module 220. In one implementation, the pre-processing module 304 receives one or more types of facial images including query facial images, training facial images and other facial images.

A query facial image is a type of facial image including a facial feature, occasionally referred to herein as a "query feature." The query feature is the facial feature for which a similar feature is to be identified by the similar feature identifier module 220, i.e., the similar feature identifier module 220 identifies one or more other images with a facial feature similar to the query feature. For example, assume the user 125 wants to identify whether a child's chin (query feature) is more similar to the chin of the child's mother or father. The user uploads an image of the child (query image) and images of the child's mother and father (other images).

In one implementation, the one or more query features are user 125 selectable. For example, the user 125 can select that the similar feature identifier module 220 identify only ears and eyes similar to the query image. After that the user 125 can select that the similar feature identifier module 220 identify only cheekbones similar to the query image. In another implementation, the one or more query features are predetermined. For example, the similar feature identifier module 220 identifies the most similar facial feature for every facial feature.

A training facial image is a type of facial image including a facial feature used in generating the similarity model. The similarity model is applied in relation to the query image and the other images to identify at least one feature included in an other image as most similar to the query feature. For example, in one implementation, triplets of facial features from training images are used to generate the similarity model. The similarity model and its creation are discussed in detail below.

An other facial image is a type of facial image including a facial feature that has the similarity model applied to it in relation to the query image in order to identify a feature in at least one of the other images that is similar to the query feature. In the above example, the similarity model is applied to the chins of the child's father and mother from the facial images of the father and mother (other images) in relation to the chin of the child (query feature) from the image of the child (query image).

Depending on the implementation, the one or more facial images may be received from one or more sources including, e.g., a third party application server 107, a social network server 101, a search server 180, a user application server 130, a user device 115, etc. In one implementation, the source of a facial image depends upon the type of the facial image. For example, the query facial image is received from the user 125 via a user device 115, training facial images are received from the search server 180, e.g., an image search engine, and other images are received from a social network 101. In another implementation, the source of the facial images is not related to the type of facial image. In one implementation, a facial image is a video frame treated as an image. For example, the query facial image and/or a training facial image is a video frame including a facial feature according to one implementation.

In one implementation, the source of the facial images is user 125 selectable. For example, the user 125 can select to identify the most similar ears (query feature) from the user's contacts on a social network (via the social network server 101), or, more specifically, the user's family members on the social network. In another example, the user 125 may select to search the Internet (via the search server 180) for the most similar ears (query feature) available on the Internet. In still another example, the user 125 may select to upload facial images of his/her parents to see which facial features the user inherited from which parent, i.e., which facial features are most similar between the user and each parent. It will be recognized that the foregoing are just examples of one or more sources from which the pre-processing module 304 can receive facial images and other facial image sources exist.

In one implementation, the receipt of facial images as described herein is subject to user consent. In some implementations, a user is prompted to explicitly allow images of the user 125 or otherwise associated with the user 125 or the user's account to be received by the pre-processing module 304. For example, the user 125 is prompted to explicitly allow the user's social network images to be received by the pre-processing module 304 and used to identify images with similar facial features. Further, the user may opt in/out of participating in the identification of images with similar facial features.

The pre-processing module 304 detects the key-points of a facial image by applying a key-point detection algorithm to the facial image. In one implementation, the key-point detection algorithm is a Bayesian model that combines local detector outputs with a consensus of non-parametric global models for key-point locations, computed from exemplars, referred to herein as the "Bayesian model" and described in P. Belhumeur et al. "Localizing Parts of Faces Using a Consensus of Exemplars," proceedings of the $24^{th}$ IEEE Conference on Computer Vision and Pattern Recognition (CVPR) June 2011, which is herein incorporated by reference in its entirety. For example, the Bayesian model (i.e., a key-point detection algorithm) is used to identify one or more of the chin, a corner of the mouth, tip of the nose, center of an eye, corner of an eye, corner of an eyebrow, etc. (i.e., key-points). It will be recognized that the foregoing are just examples of a key-point detection algorithm and key-points used by the pre-processing module 304 and that other key-point detection algorithms and key-points exist.

The pre-processing module 304 applies a warping transformation based at least in part on the one or more key-points. The warping transformation conforms the facial image to a canonical image. In one implementation, the warping transformation applies one or more of translation, rotation and scaling. For example, assume the canonical face is the face depicted in FIG. 4. Also, assume that the facial image is a relatively small image of a user's face where the user 125 is looking directly at the camera but the user 125 tilted, or cocked, his/her head slightly and the user's face is not centered in the image. The pre-processing module 304 rotates the facial image so that the centers of the user's eyes are on the same horizontal axis to compensate for the head tilt. The pre-processing module 304 then scales and translates the facial image until the centers of the user's eyes are located at points E1 and E2 to compensate for the smaller size and off-centeredness of the facial image, respectively. It will be recognized that preceding is merely an example of a warping transformation and that other examples exist. For example, a warping transformation may use other geometric transformations such as homography.

In some implementations, the facial image may be rejected if it does not conform to the canonical face. For example, assume the canonical face is a frontal view of a face and the facial image is an oblique view of the face. The pre-processing module 304 determines that the tip of the nose is not horizontally approximately half way between the centers of the eyes, and the facial image is rejected. In one such implementation, when the image is rejected a notification is sent to the user 125 informing the user 125 of one or more of that the facial image was rejected, why the image was rejected and how to avoid a future image rejection. For example, the notification may read "Sorry, we are unable to use the image provided because it is not a frontal view of the face. Please, provide an image where the subject is facing the camera." The preceding is just one example of a reason to reject a facial image and one example of a notification. It will be recognized that a facial image may be rejected for other and/or different reasons and other and/or different notifications exist.

In other implementations, facial images are not rejected. For example, the pre-processing module 304 applies a warping transformation on a facial image of an oblique view of a face to align the centers of the eyes with the centers of the eyes of a canonical face, e.g., points E1 and E2 of FIG. 4, and continues processing the facial image as if it conforms to the frontal view canonical face.

In one implementation, when the facial image conforms to the canonical face, the pre-processing module 304 defines one or more facial areas in the facial image based at least in part on the one or more key-points detected above. A facial area includes one or more facial features. In one implementation, a facial area is defined by the pre-processing module 304 assigning the one or more key-points associated with a feature to a set and computing area parameters for the set.

Referring again to FIG. 4, the facial areas are shown by areas A1, A2, A3 and A4. In one implementation, these facial areas are obtained by assigning the key-points to one or more sets. For example, in FIG. 4, the key-points for the eyes and eyebrows were assigned to a first set; the key-points for the nose to a second set; the key-points for the mouth to a third set; and the key-point for the chin to a fourth set.

The pre-processing module 304 calculates the area parameters for each facial area. The area parameters are the parameters that define the dimensions and location of a facial area. In one implementation, the area parameters comprise the height, width and center for each facial area. For example, in one implementation, the pre-processing module 304 calculates the horizontal center ("C") of all facial areas A1, A2, A3, A4 to be the average of the x coordinates for the centers of the eyes (i.e., E1 and E2).

The pre-processing module 304 calculates the width of each facial area based at least in part on the location of at least one key-point ("p") in the set ("S"). For example, in one implementation, the pre-processing module 304 calculates the width based at least in part on the maximum ("Max") horizontal distance ("dist") from the horizontal center C of all key-points ("p") in the set ("S"). Therefore, in one implementation, the width may be expressed as $2*Max\_\{p \text{ in } S\}dist(p, X=C)$. In another implementation, the pre-processing module 304 calculates the width based at least in part on the second-to-maximum ("robustMax") horizontal distance ("dist") from the horizontal center C of all key-points ("p") in the set ("S"). Therefore, in one implementation, the width may be expressed as $robustMax\_\{p \text{ in } S\}dist(p, X=C)$. In yet other implementations, the pre-processing module 304 calculates the width based at least in part on the Max or robustMax of the horizontal distances between any two points ("p") in the set ("S"). For example, assume the set S has key-points associated with a mouth, the pre-processing module 304 calculates the horizontal distances between the different combinations or permutations of key-points and calculates the maximum distance which may be between the two key-points associated with the corners of the mouth.

In some implementations, the pre-processing module 304 multiplies the Max or robustMax by a factor ("F"). In one implementation, the factor F ensures that the facial area includes the key-points of the set and some additional area around the key-points. For example, F=1.1. Therefore, in one implementation, the pre-processing module 304 calculates the width of a $j^{th}$ facial area as $W_j=F*2*Max\_\{p \text{ in } S_j\}dist(p, X=C)$. In another implementation, the pre-processing module 304 calculates the width of a $j^{th}$ facial area as $W_j=F*2*robustMax\_\{p \text{ in } S_j\}dist(p, X=C)$. It will be recognized that the preceding are merely examples of how the width of a facial area is calculated, and other examples exist.

The pre-processing module 304 calculates the vertical center ("V") of each facial area. In one implementation, the pre-processing module 304 calculates the vertical center of each facial area to be the median y coordinate of the key-points in the set. In another implementation, the pre-processing module 304 calculates the vertical center of each facial area to be the mean y coordinate of the key-points in the set.

The pre-processing module 304 calculates the height of each facial area based at least in part on the location of at least one key-point ("p") in the set ("S"). For example, in one implementation, the pre-processing module 304 calculates the height based at least in part on the maximum ("Max") vertical distance ("dist") from the vertical center V of all key-points ("p") in the set ("S"), which may be expressed as $2*Max\_\{p \text{ in } S\}dist(p, Y=V)$. In another implementation, the pre-processing module 304 calculates the height based at least in part on the second-to-maximum ("robustMax") vertical distance ("dist") from the vertical center V of all key-points ("p") in the set ("S"), which may be expressed as $robustMax\_\{p \text{ in } S\}dist(p, Y=V)$. In other implementations, the pre-processing module 304 calculates the height based at least in part on the Max or robustMax of the vertical distances between any two points ("p") in the set ("S"). For example, assume the set S has key-points associated with a mouth, the pre-processing module 304 calculates the vertical distances between the different combinations or permutations of key-points and calculates the max distance which may be between the two key-points associated with the top of the upper-lip and bottom of the lower-lip.

In some implementations, the pre-processing module 304 multiplies the Max or robustMax by a factor ("F"). In one implementation, the factor F ensures that the facial area includes the key-points of the set and some extra area around the key-points. Therefore, in one implementation, the pre-processing module 304 calculates the height of a $j^{th}$ facial area as $H_j=F*2*Max\_\{p \text{ in } S_j\}dist(p, Y=V_j)$. In another implementation, the pre-processing module 304 calculates the height of a $j^{th}$ facial area as $H_j=F*2*robustMax\_\{p \text{ in } S_j\}dist(p, Y=V)$. It will be recognized that the preceding are merely examples of how the height of a facial area is calculated, and other examples exist. Moreover, it will be recognized that the preceding are merely examples of how the horizontal and vertical centers are calculated other examples exist. For example, in one implementation, the robustMax is not the second-to-maximum vertical/horizontal distance. Depending on the implementation, the robustMax may be the third-to-maximum distance or the fourth-to-maximum distances or so on.

Referring again to FIG. 4, the facial areas A1, A2, A3 and A4, have been defined for the facial image shown. As illustrated, A1 includes the key-points associated with two facial features, i.e., eyes and eyebrows, has a height H1, a width W1 and a center at (C,V1). A2, A3 and A4 each include key-points associated a single feature, i.e., the nose, mouth and chin, respectively. The depicted areas A1, A2, A3 and A4 of FIG. 4 are just examples of facial areas according to one implementation. For example, the areas A2, A3 and A4 will not typically share a common vertical boundary. Moreover, a facial area may include other or different facial features than the example implementation of FIG. 4. For example, the eyes and eyebrows could each be separate facial areas. In another example, a facial area could include one or more of the face's hair-line, jaw-line, cheekbones, dimples, ears or any other facial feature.

In one implementation, when one or more facial areas have been defined by the pre-processing module 304, the pre-processing module 304 scales the one or more facial areas to a standardized area. A facial area that has been scaled to the standardized area is sometimes referred to herein as a "scaled area."

In one implementation, the pre-processing module 304 passes the one or more scaled areas to the feature extraction module 306. For example, the pre-processing module 304 is communicatively coupled to the feature extraction module 306 to send the one or more scaled areas to the feature extraction module 306. In another implementation, the pre-processing module 304 (or the communication interface 302) stores the one or more scaled areas in the storage device 214 (or any other non-transitory storage medium communicatively accessible). The other modules of the similar feature identifier module 220, e.g., the feature extraction module 306 can retrieve the one or more scaled areas by accessing the storage device 214 (or other non-transitory storage medium).

The feature extraction module 306 is code and routines for extracting a feature set from a scaled area. In one implementation, the feature extraction module 306 is a set of instructions executable by the processor 206. In another implementation, the feature extraction module 306 is stored in the memory 208 and is accessible and executable by the processor 206. In either implementation, the feature extraction module 306 is adapted for cooperation and communication with the processor 206 and other components of the computing device 200 including other components of the similar feature identifier module 220.

The feature extraction module 306 extracts a feature set from a scaled area. In one implementation, a feature set is based at least in part on the one or more key-points of the one or more features of the scaled area. In one implementation, the feature extraction module 306 extracts a feature set comprising one or more of a coordinate, a histogram and a vector. For example, referring again to FIG. 4, the feature extraction module 306 extracts from the scaled area A1 a feature set that includes the coordinates of the key-points shown defining the eyes and eyebrows and a vector or histogram describing eye color.

In one implementation, the feature extraction module 306 extracts a feature set based at least in part on linear binary patterns (LBP). In one implementation, the feature extraction module 306 extracts a feature set based at least in part on color and texture. In one implementation, the feature extraction module 306 extracts a feature set based at least in part on scale invariant feature transform (SIFT).

In one implementation, the feature extraction module 306 passes the feature set to the model creation module 308. For example, the feature extraction module 306 is communicatively coupled to the model creation module 308 to send the feature set to the model creation module 308. In another implementation, the feature extraction module 306 (or the communication interface 302) stores the feature set in the storage device 214 (or any other non-transitory storage medium communicatively accessible). The other modules of the similar feature identifier module 220 including the model creation module 308 can retrieve the feature set by accessing the storage device 214 (or other non-transitory storage medium).

The model creation module 308 is code and routines for creating a similarity model. In one implementation, the model creation module 308 is a set of instructions executable by the processor 206. In another implementation, the model creation module 308 is stored in the memory 208 and is accessible and executable by the processor 206. In either implementation, the model creation module 308 is adapted for cooperation and communication with the processor 206 and other components of the computing device 200 including other components of the similar feature identifier module 220.

The model creation module 308 creates a similarity model per facial feature. In one implementation, the model creation module 308 creates a similarity model by comparing a first feature set of a facial feature (e.g., eyes) to a plurality of feature sets of the same facial feature (e.g., eyes). In one implementation, the model creation module 308 creates a similarity model based at least in part on machine learning.

For example, assume training images are received and pre-processed by the pre-processing module 304 and that the feature extraction module 306 extracts the feature sets from each scaled area of each of the training images. In one implementation, the model creation module 308 creates triplets. A triplet is based at least in part on three scaled areas of the same facial feature, e.g., three images of noses. In one implementation, the model creation module 308 applies a mechanical Turk by submitting the triplets to a human evaluator. The model creation module 308 receives an inequality constraint from the human evaluator defining which of the two scaled areas of the triplet are the most similar. For example, assume the triplet includes scaled areas of a mother's nose ("B"), a child's nose ("A") and a fathers nose ("C"), the three scaled areas are submitted to a human evaluator, and the human evaluator returns an inequality constraint of the type Sim(A, B)<Sim(A,C), where Sim( ) is a similarity function that all triplets obey and that assigns a higher similarity measure to the pair of more similar scaled areas within each triplet based at least in part on the similarity model ("M"). In other words, in one implementation, the higher the similarity measure the more similar the feature sets. It will be recognized that a mechanical Turk is merely one example for obtaining inequality constraints and that other examples exist.

The model creation module 308 creates a similarity model based at least in part on a plurality of inequality constraints. In one implementation, the model creation module 308 creates a linear similarity model ("M") based at least in part on margin learning from the plurality of inequality constraints. In one implementation, the similarity model is created using a passive-aggressive family of learning algorithms with a large margin criterion and efficient hinge loss in order to create a Sim( ) function that is a bilinear similarity measure over sparse representations. For example, the online algorithm for scalable image similarity ("OASIS"), which is described in G. Chechik et al. "An Online Algorithm for Large Scale Image Similarity Learning" J. Machine Learning Research.

11p. 1109-1135, 2010 and is herein incorporated in its entirety, is applied to the plurality of inequality constraints. The linear similarity model ("M") is used to measure the similarity between a first column vector representation of a first feature set ("$v_1$"), and a second column vector representation of a second feature set ("$v_2$") using the formula $\text{Sim}(v_1, v_2) = v_1^T M v_2$, where $\text{Sim}(v_1, v_2)$ is a similarity measure based at least in part on how similar feature set $v_1$ is to feature set $v_2$ and $v_1^T M v_2$ is the bilinear form. The values of the matrix M are learned from the plurality of inequality constraints, yielding a matrix that is not forced to be symmetric or positive.

Machine learning beneficially improves the accuracy of identifying a similar feature because it allows the similarity model to capture what humans find important in determining similarities. For example, assume eye color is more important to a human than the shape of the eye or the space between the eyes in determining similarity, machine learning allows the model capture how similar the eye shape must be before eyes of a different color are considered most similar. The similarity model ("M") in one implementation is scalable, quickly trained, and accurate. It will be understood that the aforementioned creation of a similarity model is just an example of creating a similarity model and other examples of creating a similarity model and other similarity models exist.

In some implementations, the model creation module 308 creates a similarity model based at least in part on batch machine learning. In some embodiments, the model creation module 308 creates a similarity model based at least in part on online machine learning. Utilization of online machine learning may beneficially produce a more accurate similarity model ("M") in the long term. Online machine learning is an iterative process. For example, assume that the similarity model ("M") predicts which pair of features from a first triplet are most similar and compares the prediction to an inequality constraint received from the human evaluator for the first triplet, in some implementations, the model creation module 308 modifies the similarity model ("M") or creates a new similarity model (e.g. using margin learning from the plurality of inequality constraints) so that the resulting similarity model ("M") is more likely to predict the same pair of features as those features indicated by the inequality constraint as most similar. This process may be repeated many times, or continuously, to refine the similarity model. For example, the resulting similarity model ("M") in the above example predicts which pair of features from a second triplet are most similar and compares the prediction to an inequality constraint received from the human evaluator for the second triplet, in some implementations, the model creation module 308 modifies the similarity model ("M"), or creates a new similarity model ("M"), so that the resulting similarity model ("M") is more likely to predict the same pair of features as those features indicated by the inequality constraint as most similar. It will be recognized the preceding is merely an example of online learning and that other examples exist.

It will be further recognized that use of batch machine learning and online machine learning are not necessarily exclusive. For example, in some implementations, the similarity model ("M") is initially created using batch machine learning and then modified by online machine learning to modify and improve the accuracy of the similarity model ("M"). In another example, in some implementations, the online machine learning itself may utilize "mini-batches" including a plurality of triplets. For example, assume a "mini-batch" including a plurality of triplets is received. Also, assume that the similarity model ("M") predicts which pair of features within each triplet of the mini-batch are most similar and compares the prediction to the inequality constraint received from the human evaluator for each feature within each triplet, in some implementations, the model creation module 308 modifies the similarity model ("M") or creates a new similarity model (e.g. using margin learning from the plurality of inequality constraints) so that the resulting similarity model ("M") is more likely to predict the same pair of features within each triplet of the mini-batch as those features indicated by the inequality constraint as most similar.

In one implementation, the model creation module 308 passes the similarity model ("M") to the similarity identifier module 310. For example, the model creation module 308 is communicatively coupled to the similarity identifier module 310 to send the similarity model to the similarity identifier module 310. In another implementation, the model creation module 308 (or the communication interface 302) stores the similarity model in the storage device 214 (or any other non-transitory storage medium communicatively accessible). The other modules of the similar feature identifier module 220, e.g., the similarity identifier module 310, can retrieve the similarity model by accessing the storage device 214 (or other non-transitory storage medium).

The similarity identifier module 310 is code and routines for identifying at least one feature from a plurality of other images as most similar to a query feature based at least in part on the similarity model. In one implementation, the similarity identifier module 310 is a set of instructions executable by the processor 206. In another implementation, the similarity identifier module 310 is stored in the memory 208 and is accessible and executable by the processor 206. In either implementation, the similarity identifier module 310 is adapted for cooperation and communication with the processor 206 and other components of the computing device 200 including other components of the similar feature identifier module 220.

The similarity identifier module 310 identifies at least one feature from a plurality of other images as most similar to a query feature based at least in part on the similarity model. In one implementation, the similarity identifier module 310 identifies at least one feature from a plurality of other images that is most similar to a query feature by applying the similarity model to the query feature set, i.e., the feature set from a query scaled area, in relation to feature sets from a plurality of other images and determining at least one feature set from the plurality of other images as the most similar to the query feature set based at least in part on the model.

For example, assume the user 125 desires to identify which face has the most similar nose to the user's nose (query feature). In one implementation, the user 125 uploads an image of the user 125 (query image). The pre-processing module 304 receives the query image and generates a scaled area based at least in part on the one or more key-points of the query feature, sometimes referred to herein as the "query scaled area." The similar feature extraction module 306 extracts a feature set associated with the query scaled area.

The pre-processing module 304 receives a plurality of other images, e.g., from the storage device 214, social network server 101 and the search server 180. In some implementations, the other images received by the pre-processing module 304 and used to identify a feature set as most similar to the query feature set may be broad in scope. For example, the other images are received from any accessible data source (e.g. facial images available via the Internet). In some implementations, the other images received by the pre-processing module 304 and used to identify a feature set as most similar to the query feature set may be limited in scope. In some implementations, the plurality of other images is limited to other images uploaded by the user. For example, assume the user uploads photos of his/her parents, in some implementations, the similarity identifier module 310 identifies a feature (e.g. a nose) from the uploaded images (e.g. images of the user's parents) as most similar to the user's query feature (e.g. nose) based at least in part on the similarity model. In some implementations, the plurality of other images is limited based on a user defined or predetermined rule(s). For example, assume the user desires to know which family member has the most similar facial feature (e.g. nose), in some implementations, the similarity identifier module 310 identifies a feature (e.g. a nose) as most similar to the user's query feature (e.g. nose) based at least in part on the similarity model from the profile photos of family members obtained with permission of the user and family members from a social network using the user's social graph to determine family relations. It will be recognized that the preceding are merely examples of the potential scope of what other images may be used to identify a feature set as most similar to the query feature set and that other examples exist.

The pre-processing module 304 generates a plurality of scaled areas each comprising a nose from each of the plurality of other images. The similar feature extraction module 306 extracts the feature set based at least in part on the facial feature (e.g., the nose) from each of the scaled areas, sometimes referred to herein collectively as "other feature sets." The similarity identifier module 310 then applies the similarity model previously created by the model creation module 308 to the query feature set and the other feature sets obtaining a similarity measure for each query feature set in relation to each other feature set. The similarity identifier module 310 determines based at least in part on the similarity measure at least one of the other feature sets to be the most similar to the query feature set. In other words, the similarity identifier module 310 identifies at least one other feature set as most similar to the query feature set, sometimes this other feature set is referred to herein as the "most similar feature set."

In some implementations, a most similar set may include a feature set identical to the query feature set. Such an implementation may be useful in confirming identity based on facial recognition. In some implementations, a most similar feature set excludes feature sets identical (e.g. above a defined threshold of matching) to the query set. For example, assume a user wants to know which family member has the most similar eyes to the user, in some implementations, the similarity identifier module 310 determines the most similar feature set by comparing feature sets from photos of the user's family members (e.g. family photos uploaded by the user, profile photos of family members obtained with permission of the user and family members from a social network using the user's social graph, etc.) and determining the most similar feature set that is not the user's feature set. For example, in some implementations, the similarity identifier module 310 may determine that the most similar feature set is a brother's feature set even if the user's own feature set is present in the other images. Such an implementation may be useful in determining which individuals other than the individual himself/herself have a similar facial feature.

In one implementation, the similarity identifier module 310 identifies the other feature set, or other feature sets in the event of a tie, associated with the highest similarity measure as the most similar. In another implementation, the similarity identifier module 310 identifies one or more other feature sets associated with a similarity measure that exceeds a threshold as most similar. For example, all feature sets with a similarity measure equal to or greater than 0.90, or 90%, are identified as most similar. In yet another implementation, the similarity identifier module 310 identifies a predefined number, or quota, of other feature sets associated with the highest similarity measures. For example, assume the quota is five, the five other feature sets with the five highest similarity measures are identified as most similar.

A result is based at least in part on the at least one most similar feature set identified. In one implementation, a result includes one or more of a most similar feature set, the other facial image associated with the most similar feature set, the scaled area associated with the most similar feature set and the similarity measure associated with the most similar feature set. For example, assume a father's chin is identified as having the most similar feature set to that of the child, in one implementation, the result would include the scaled image of the father's chin and/or the facial image of the father.

In one implementation, the similarity identifier module 310 passes the one or more results to one or more of the ranking module 312 and the result display module 314. For example, the similarity identifier module 310 is communicatively coupled to one or more of the ranking module 312 and the result display module 314 to send the one or more results to the ranking module 312 and/or the result display module 314. In another implementation, the similarity identifier module 310 (or the communication interface 302) stores the one or more results in the storage device 214 (or any other non-transitory storage medium communicatively accessible). The other components of the system 100, e.g., the ranking module 312 and/or the result display module 314, can request and receive the one or more results, which is retrieved by accessing the storage device 214 (or other non-transitory storage medium).

The optional ranking module 312 is code and routines for ranking the one or more results. In one implementation, the ranking module 312 is a set of instructions executable by the processor 206. In another implementation, the ranking module 312 is stored in the memory 208 and is accessible and executable by the processor 206. In either implementation, the ranking module 312 is adapted for cooperation and communication with the processor 206 and other components of the computing device 200 including other components of the similar feature identifier module 220.

In one implementation, the ranking module 312 ranks the results based at least in part on the degree of similarity. In one such implementation, the ranking module 312 ranks the one or more results based at least in part on the similarity measure assigned by the similarity model. For example, assuming the higher the similarity measure the more similar the associated feature is to the query feature and assuming the results are associated with the five features having the five highest similarity measures to the query feature, the ranking module ranks those five features in order from highest similarity measure to lowest similarity measure. In one implementation, the ranking module 312 ranks the results based at least in part on one or more other criteria. For example, the source of the other image or the user's relationship with the person in the other image.

In one implementation, the ranking module 312 passes ranked results to the results display module 314. For example, the ranking module 312 is communicatively coupled to the results display module 314 to send the ranked results to the results display module 314. In another implementation, the ranking module 312 (or the communication interface 302) stores the ranked results in the storage device 214 (or any other non-transitory storage medium communicatively accessible). The other modules of the similar feature identifier module 220, e.g., the results display module 314, can retrieve the ranked results by accessing the storage device 214 (or other non-transitory storage medium).

The results display module 314 is code and routines for presenting one or more results to a user 125. In one implementation, the results display module 314 is a set of instructions executable by the processor 206. In another implementation, the results display module 314 is stored in the memory 208 and is accessible and executable by the processor 206. In either implementation, the results display module 314 is adapted for cooperation and communication with the processor 206 and other components of the computing device 200 including other components of the similar feature identifier module 220.

The results display module 314 presents one or more results to a user 125 by generating presentation data. Presentation data is data that, when processed, presents the user 125 via user device 115. For example, the one or more results are presented visually or audibly. In some implementations, the results display module 314 also presents a feedback mechanism by which the user may confirm or refute the presented results. In some such implementations, the similarity model is based at least in part on online machine learning and the user's feedback is received by the model creation module 308 and used to update/modify the similarity model ("M").

In one implementation, presentation data presents the one or more results visually. For example, the ten sets of eyes most similar to the eyes of a query image are displayed. For another example, the facial image of the parent with the most similar chin to the child's is displayed. For yet another example, the name of a social network contact (e.g., friend) with a facial feature most similar to the query feature is displayed.

In one implementation, the presentation data displays one or more of the query facial image and the scaled image of the query feature with one or more of the other facial image and other scaled image identified as most similar. Such an implementation, beneficially allows a user to 125 to visually compare the query feature to the feature from the other image identified as most similar and assess the accuracy of the identification and extent of the similarity. The preceding are just examples of visual results and what can be presented. It will be understood that other examples of visual results exist and can contain other or different information.

In another implementation, the results are presented audibly to the user 125. For example, assuming the user's sister, Lindsey, has eyes most similar to the user 125, the user device 115 may play "Lindsey" through the speakers of a user device 115.

In one implementation, the results presented to the user 125 are ranked results. For example, the top three most similar features to the query feature are presented to the user in order from most similar to least similar.

In one implementation, the results display module 314 passes presentation data to the user device 115. For example, the results display module 314 is communicatively coupled to the user device 115 to send the presentation data to the user device 115. In another implementation, the results display module 314 (or the communication interface 302) stores the presentation data in the storage device 214 (or any other non-transitory storage medium communicatively accessible). The user device 115 can retrieve the presentation data by accessing the storage device 214 (or other non-transitory storage medium).

FIGS. 5-8 depict various example methods 500, 600, 700, 800 performed by the system described above in reference to FIGS. 1-4.

Figure 5:
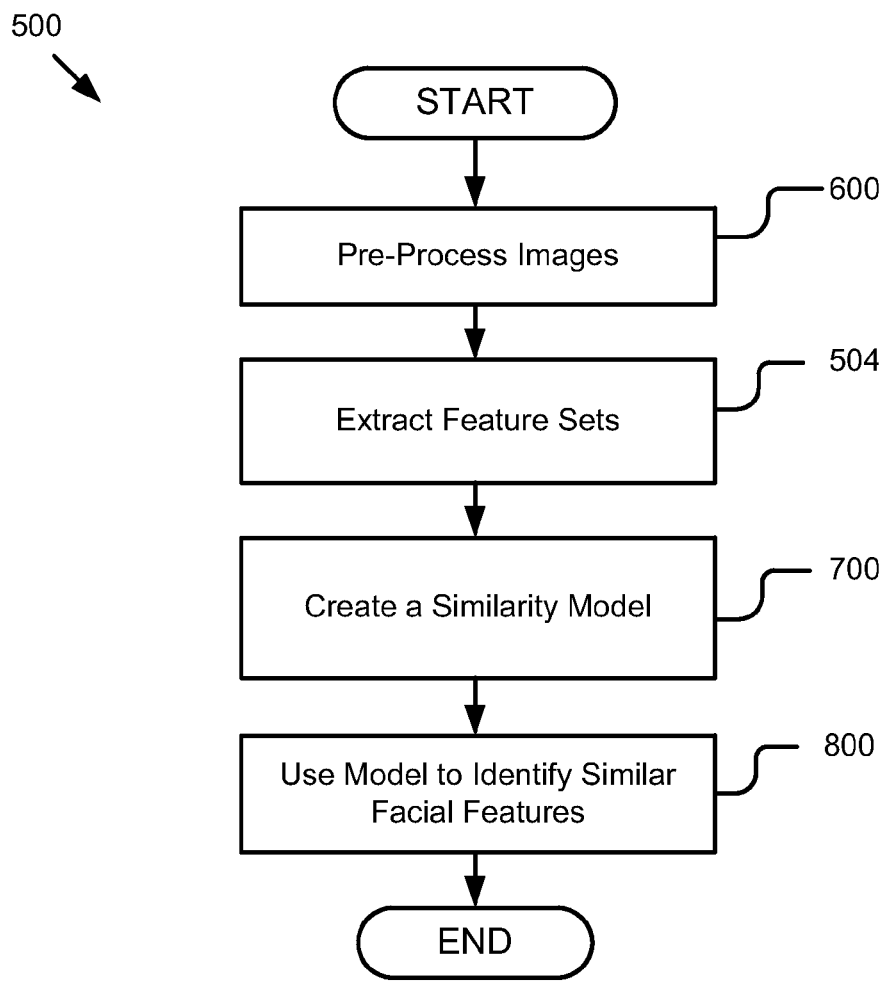
FIG. 5 is a flow chart illustrating a method for searching images and identifying images with similar facial features according to one implementation.

FIG. 5 is a flow chart illustrating a method 500 for searching images and identifying images with similar facial features according to one implementation. As illustrated, one implementation is divided into two stages. A first initialization stage comprises steps 600, 504 and 700, which result in the creation of a similarity model, and a second application stage applies the similarity model in order to identify at least one similar facial feature. At step 600, the pre-processing module 304 of the similar feature identifier module 220 pre-processes one or more facial images.

Figure 6:
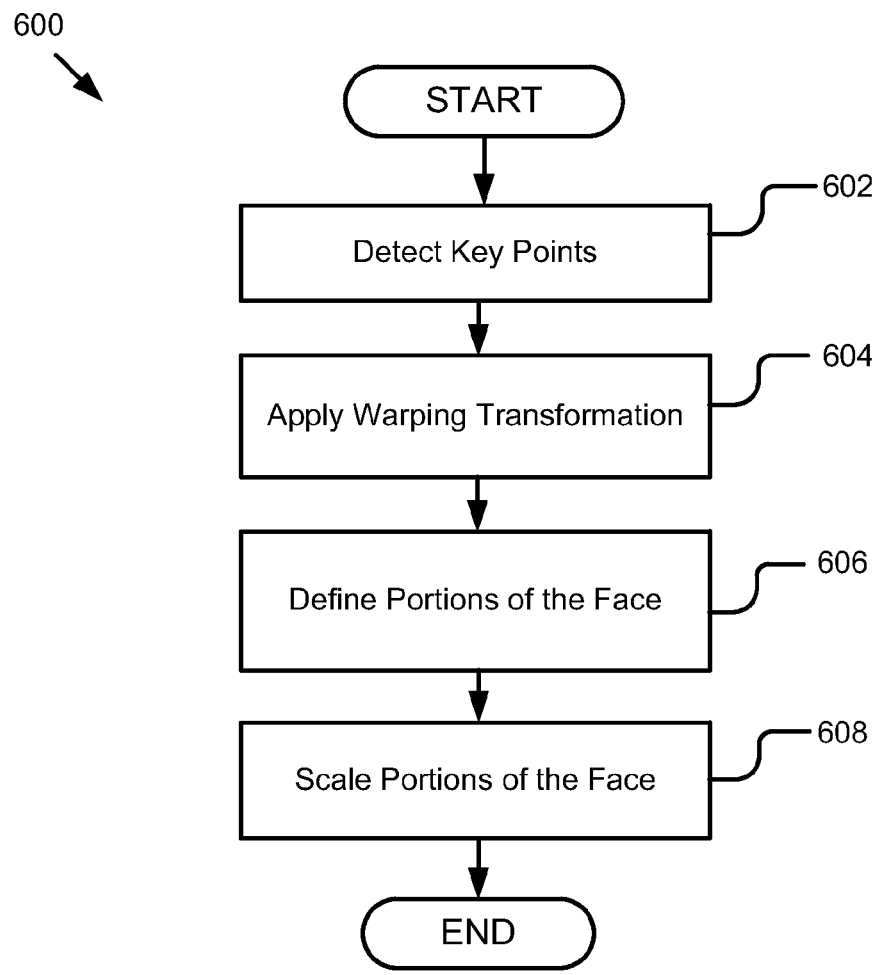
FIG. 6 is a flow chart illustrating a method for pre-processing one or more facial images according to one implementation.

FIG. 6 is a flow chart illustrating a method 600 for pre-processing one or more facial images according to one implementation. At step 602, the pre-processing module 304 detects the key-points of a facial image. At step 604, the pre-processing module 304 applies a warping transformation. In one implementation, the pre-processing module 304 rotates, translates and scales the image to map the center of the eyes in the image to the location of the eyes in a canonical image, e.g., points E1 and E2 of FIG. 4. In one implementation, the pre-processing module 304 determines whether the image is an invalid facial image (not shown). For example, in one implementation, the facial image is invalid if the image does not contain a frontal pose, which is determined by the pre-processing module 304. At step 606, the pre-processing module 304 defines the facial areas based at least in part on the key-points detected in step 602. At step 608, the pre-processing module 304 scales each facial area to a standardized area for comparison thereby completing the pre-processing of the image according to one implementation.

Referring again to FIG. 5, at step 504, the feature extraction module 306 extracts a feature set from at least one scaled area from each of the one or more pre-processed images. At step 700, a plurality of feature sets are extracted from a plurality of scaled areas of training images and used to create a similarity model.

Figure 7:
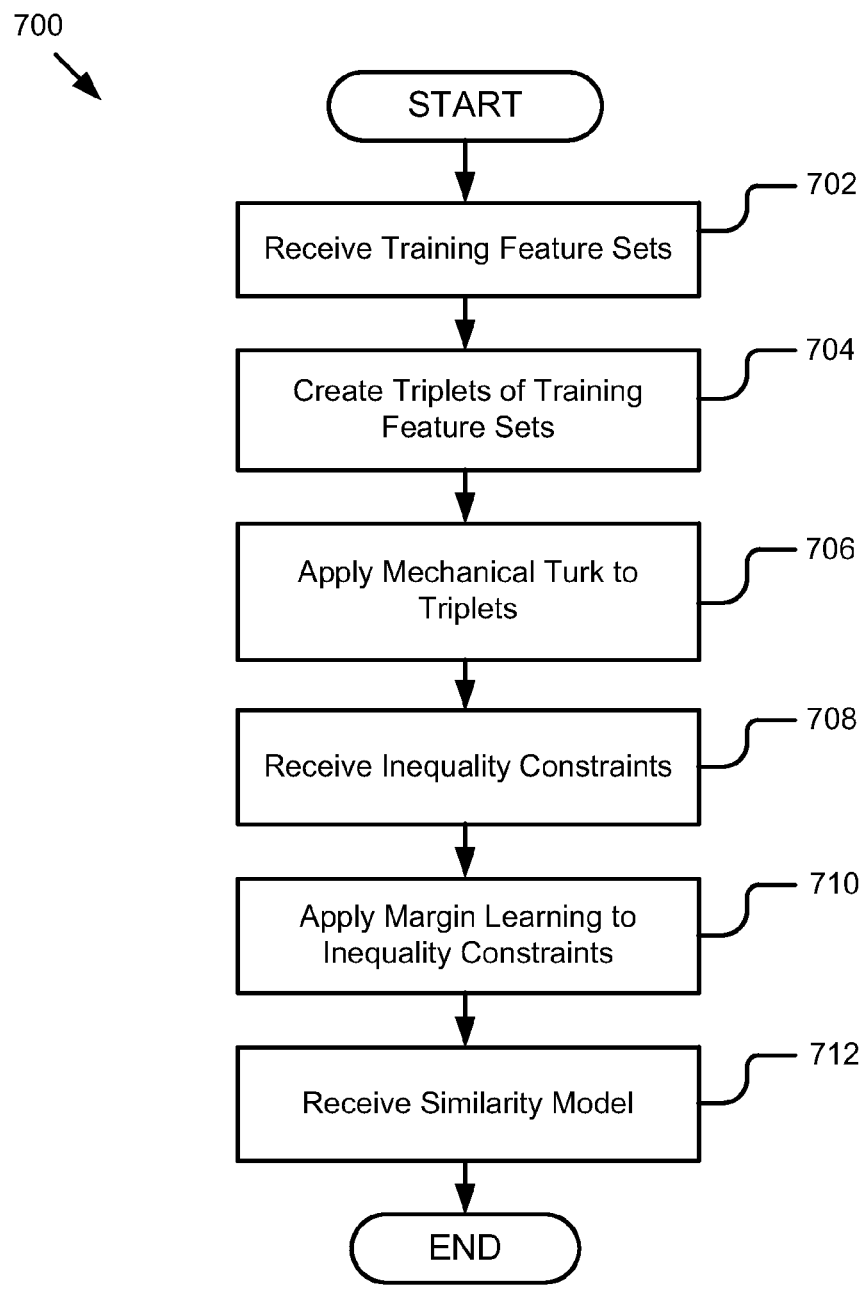
FIG. 7 is a flow chart illustrating a method for creating a similarity model according to one implementation.

FIG. 7 is a flow chart illustrating a method for creating a similarity model according to one implementation. At step 702, the model creation module 308 receives a plurality of training feature sets extracted by the feature extraction module 306 from scaled areas of a plurality of training images. At step 704, the model creation module 308 creates triplets of training feature sets and/or their associated scaled areas. At step 706, the model creation module 308 applies a mechanical Turk to the triplets. At step 708, the model creation module 308 receives the inequality constraints produced by the application of the mechanical Turk. At step 710, the model creation module 308 applies marginal learning to the inequality constraints to create a similarity model.

Referring again to FIG. 5, at step 800, the similar feature identifier module 220 identifies similar facial features.

Figure 8:
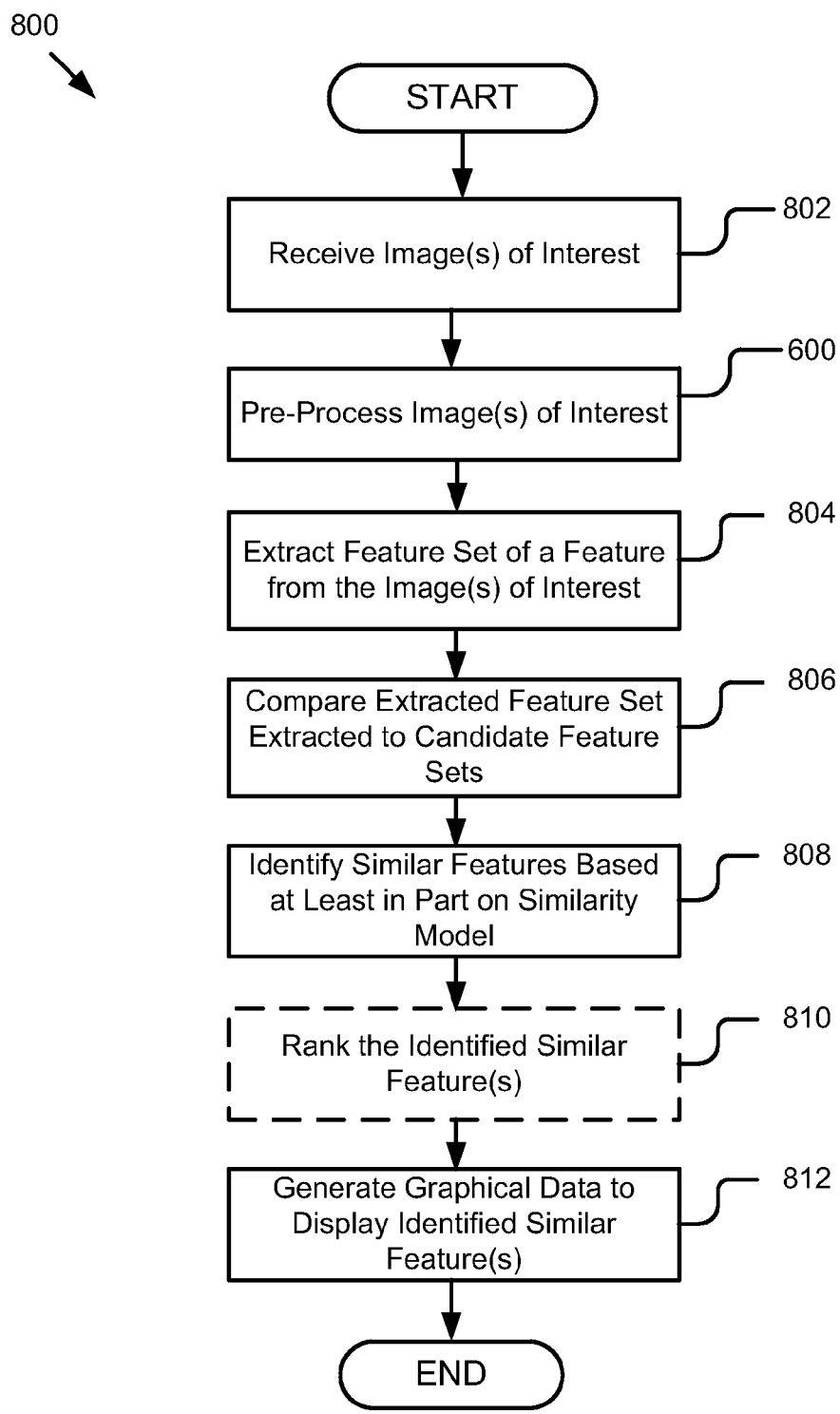
FIG. 8 is a flow chart illustrating a method for applying a similarity model to search images and identify images with similar facial features according to one implementation.

FIG. 8 is a flow chart illustrating a method for applying a similarity model to search images and identify images with similar facial features according to one implementation. At step 802, the pre-processing module 304 receives a plurality of images including a query image and two or more other images. At step 600, the pre-processing module 304 pre-processes the plurality of images. At step 804, the feature set extraction module 306 extracts the feature sets from each of the plurality of images including a query feature set and at least one feature set from each of the at least two other images. At step 806, the similarity identifier module 310 applies the similarity model to the other feature sets in relation to the query feature set. At step 808, the similarity identifier module 310 determines at least one other feature set is most similar to the query feature set based at least in part on the similarity model. Some implementations include an optional ranking module 312, which ranks, at step 810, the one or more identified similar other feature sets. At step 812, the results display module 312 presents the results to the user.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A method for searching images and identifying images with similar facial features, the method comprising:
   receiving a facial image, the facial image including a query image;
   applying a transformation to the facial image based on a set of key points associated with the facial image, the transformation of the facial image conforms to a first canonical depiction associated with an orientation of the facial area;
   identifying at least one facial area associated with the transformed facial image based on the set of key-points, the facial area including at least one facial feature;
   generating a similarity model for the at least one facial feature associated with the facial area of the facial image, the similarity model including determining similarity between the at least one facial feature associated with the facial area of the facial image and at least one corresponding facial feature associated with a plurality of training images using online machine learning, the plurality of training images including a second canonical depiction independent of the first canonical depiction associated with the facial image;
   applying the similarity model of the at least one facial feature associated with the query image to a plurality of other images;
   determining at least one similar facial feature between the query image and at least one other image of the plurality of other images using the similarity model, the at least one similar facial feature in the at least one other image of the plurality of other images satisfying a similarity measure threshold; and
   responsive to the at least one similar facial feature satisfying the similarity measure threshold, presenting for display the at least one other image including the similar facial feature.

2. The method of claim 1, wherein the similarity model is created at least in part by comparing a plurality of triplets comprising three images of the facial feature from three training images.

3. The method of claim 1, wherein the similarity model is created at least in part by comparing a plurality of mini-batches of triplets, wherein the mini-batch comprises a plurality of triplets comprising three images of the facial feature from three training images.

4. The method of claim 1, wherein the facial image is received from one or more sources including a user, a social network and an image search engine.

5. The method of claim 1, wherein the at least one facial feature is at least one of an eye, an ear, a nose, a mouth, a chin, a jaw line, a cheekbone, lips, a complexion, a skin tone, a hair color, an eyebrow, a forehead and a hairline.

6. The method of claim 1, wherein the similarity model is created at least in part by a learning algorithm with a large margin criterion.

7. The method of claim 1, wherein applying the similarity-model of the at least one facial feature associated with the query image to the plurality of other images comprises applying the similarity model to a feature set from the query image in relation to a feature set from each of the plurality of other images, the feature set based at least in part on at least one key-point associated with the facial feature.

8. The method of claim 1, wherein the at least one similar facial feature includes an area parameter.

9. The method of claim 1, wherein a plurality of results is presented, and the plurality of results are ranked and presented in ranked order.

10. A system for searching images and identifying images with similar facial features, the system comprising:
    one or more processors;
    a pre-processing model executable by the one or more processors to:
      receive a facial image, the facial image including a query image;
      apply a transformation to the facial image based on a set of key points associated with the facial image, the transformation of the facial image conforms to a first canonical depiction associated with an orientation of the facial area;
      identify at least one facial area associated with the transformed facial image based on the set of key-points, the facial area including at least one facial feature;
    a model creation module executable by the one or more processors to:
      generate a similarity model for the at least one facial feature associated with the facial area of the facial image, the similarity model including determining similarity between the at least one facial feature associated with the facial area of the facial image and at least one corresponding facial feature associated with a plurality of training images using online machine learning, the plurality of training images including a second canonical depiction independent of the first canonical depiction associated with the facial image:
    a similarity identifier module executable by the one or more processors to:
      apply the similarity model of the at least one facial feature associated with the query image to a plurality of other images;
      determine at least one similar facial feature between the query image and at least one other image of the plurality of other images using the similarity model, the at least one similar facial feature in the at least one other image of the plurality of other images satisfying a similarity measure threshold; and a results display module executable by the one or more processors to:

responsive to the at least one similar facial feature satisfying the similarity measure threshold, present for display the at least one other image including the similar facial feature.

11. The system of claim 10, wherein the model creation module creates the similarity model at least in part by comparing a plurality of triplets comprising three images of the facial feature from three training images.

12. The system of claim 10, wherein the model creation module creates the similarity model at least in part by comparing a plurality of mini-batches of triplets, wherein the mini-batch comprises a plurality of triplets comprising three images of the facial feature from three training images.

13. The system of claim 10, wherein a plurality of results are presented by the results display module, and the system further comprises:

a ranking module operable to rank the plurality of results; and wherein the results display module presents the plurality of results in ranked order.

14. The system of claim 10, wherein the pre-processing module receives the facial image from one or more sources including a user, a social network and an image search engine.

15. The system of claim 10, wherein the at least one facial feature is at least one of an eye, an ear, a nose, a mouth, a chin, a jaw line, a cheekbone, lips, a complexion, a skin tone, a hair color, an eyebrow, a forehead and a hairline.

16. The system of claim 10, wherein the model creation module creates the similarity model at least in part by using a learning algorithm with a large margin criterion.

17. The system of claim 10, wherein the similarity identifier module is operable to apply the similarity model of the at least one facial feature associated with the query image to the plurality of other images, the feature set based at least in part on at least one key-point associated with the facial feature.

18. The system of claim 10, wherein the at least one similar facial feature associated with the at least one other image includes an area parameter for the one similar facial feature.

19. The method of claim 1, wherein the similarity model is generated based on a plurality of inequality constraints.

20. The method of claim 1, wherein the transformation includes one or more of translation, rotation and standardization scaling.

* * * * *